June 6, 1933.   J. S. GOODMAN   1,912,706
AGRICULTURAL IMPLEMENT
Filed Dec. 6, 1930   2 Sheets-Sheet 1
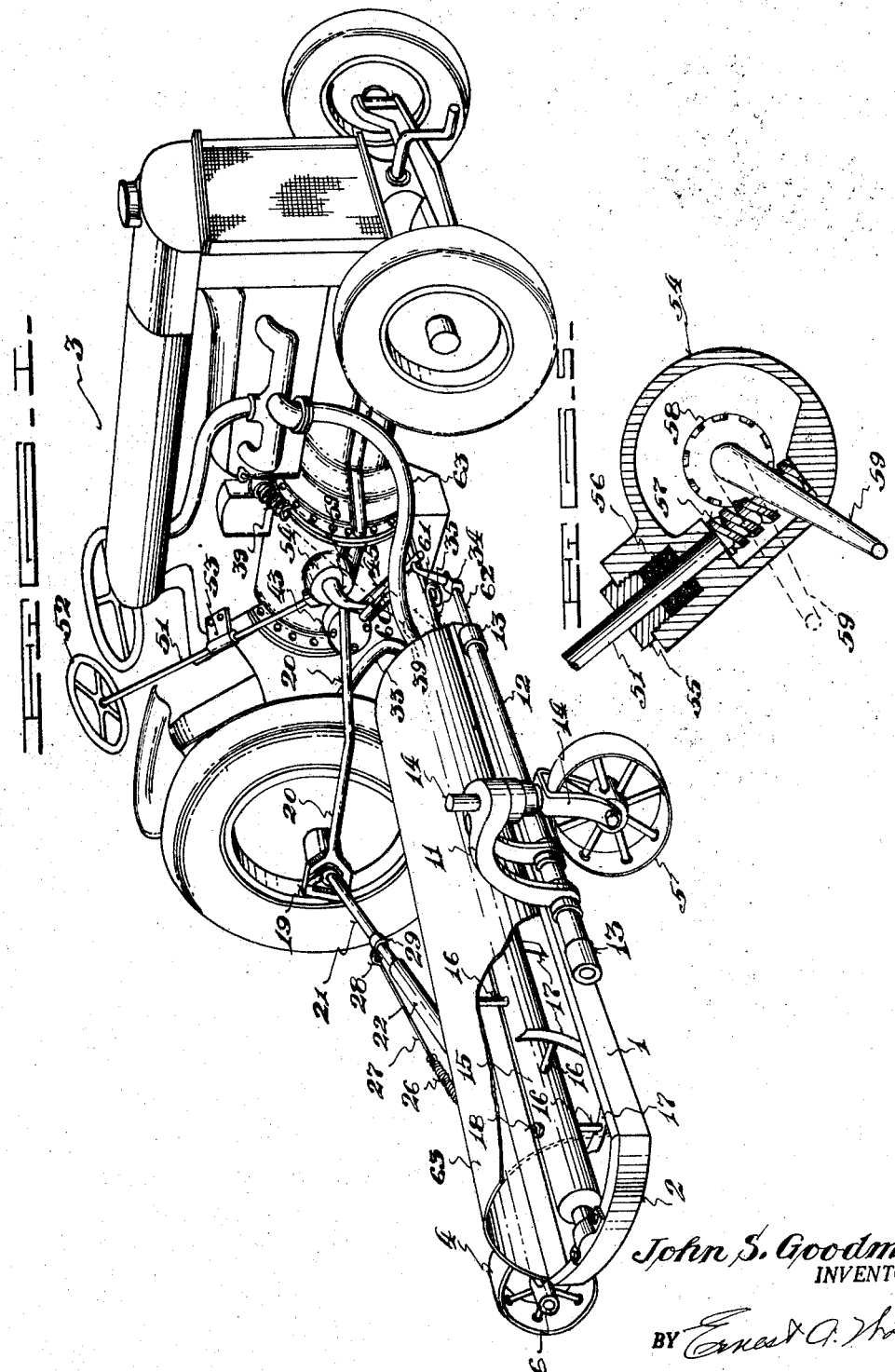
John S. Goodman
INVENTOR.
BY
ATTORNEY.

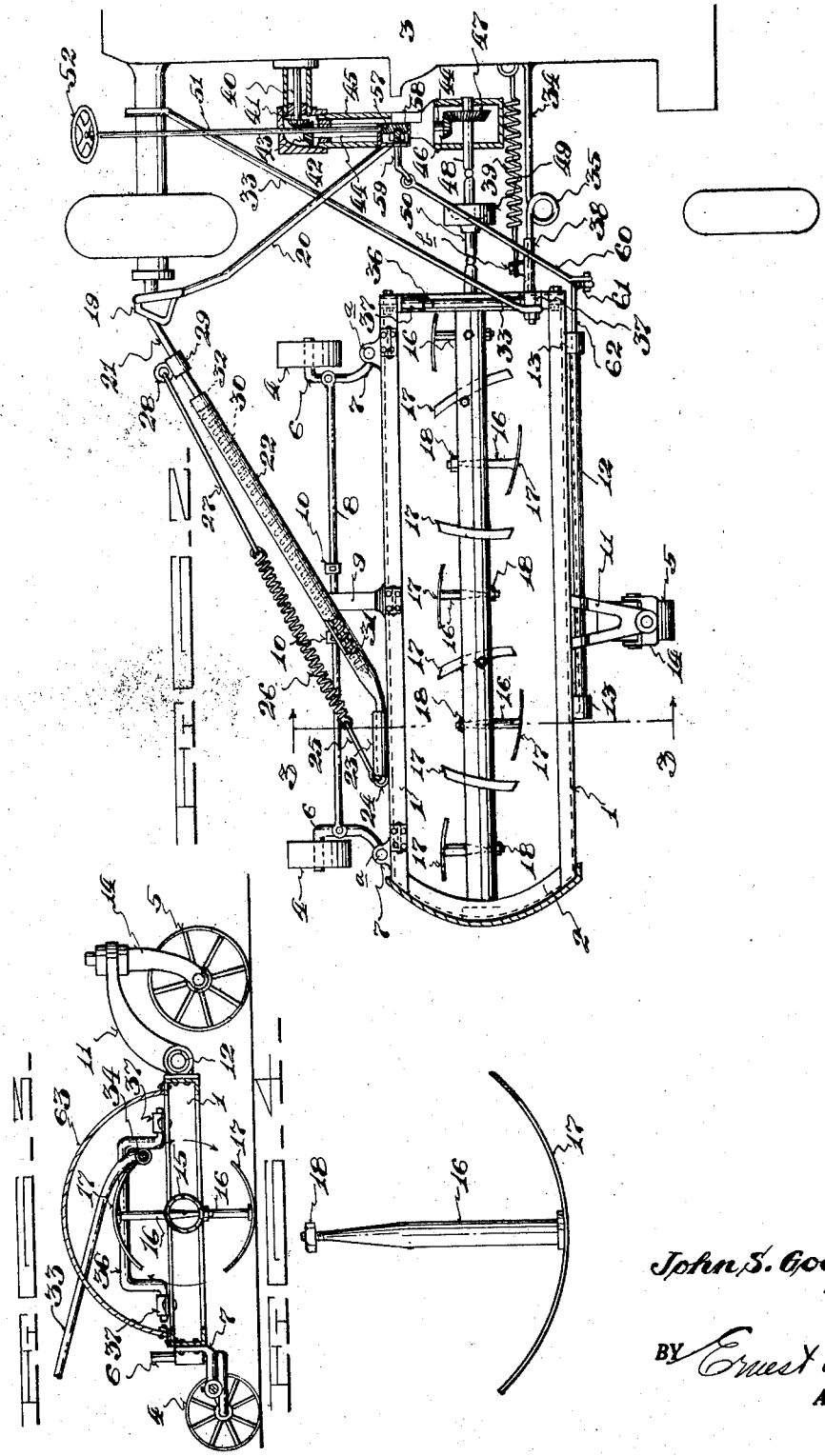

Patented June 6, 1933

1,912,706

UNITED STATES PATENT OFFICE

JOHN S. GOODMAN, OF CHARLIE, TEXAS, ASSIGNOR OF ONE-HALF TO J. W. CULBERTSON, OF WICHITA, TEXAS

AGRICULTURAL IMPLEMENT

Application filed December 6, 1930. Serial No. 500,500.

This invention relates to agricultural implements and it has particular reference to plows and soil working implements, designed primarily for orchard use and the principal object of the invention is to provide an implement of the character specified, capable of ready attachment to and operation from a tractor and so designed that it will effectually operate under the boughs of a row of trees while the draft implement may be driven between the rows of trees of an orchard and thus control the growth of undesirable grass and weeds beneath the trees which, if permitted to grow unmolested, would hinder the maturity of the fruit borne by the trees and otherwise present an unsightly appearance in an orchard.

Another object of the invention is to provide an agricultural implement having other uses than those mentioned in the foregoing, by reason of its utility in harrowing and otherwise working the soil for the planting and cultivation of vegetation, augmented by the fact that it is so connected with the draft implement that the operator may conveniently observe its performance without the slightest inconvenience and the further fact that its operation requires little attention on the part of the operator.

The invention further comprehends the provision of an implement of a simple and durable nature, provided with a hood and bumper, the prime purpose of which is to prevent throwing up of sticks, dirt and dust, which is likely to annoy the operator and has the further effect of maintaining smooth condition of the surface over which the apparatus is moved, while the bumper prevents injury to the trees, in event the outer end of the apparatus comes in contact therewith.

Yet another object of the invention resides in the provision of automatic displacing means, through the medium of which the entire apparatus will yield to any colliding obstacle and resume its proper operative position relative to the draft implement without undue strain upon the elements constituting the mounting thereof.

With the foregoing objects as paramount, the invention has particular reference to its salient features of construction and arrangement of parts which will become manifest as the description proceeds, taken in connection with the accompanying drawings, wherein:—

Figure 1 is a perspective view of a tractor showing an apparatus embodying the invention mounted thereon.

Figure 2 is a fragmentary view of a tractor, showing a plan view of the invention with the hood removed.

Figure 3 is a view on lines 3—3 of Figure 2.

Figure 4 is a detail view on one of the rotary plows, and

Figure 5 is a sectional view of the device by which the apparatus is raised and lowered relative to the ground.

Continuing more in detail, 1 designates a substantially rectangular frame of greater length than width, the outer end of which has a circular bumper 2 while the end nearest the tractor 3 is straight. The frame supported upon wheels 4 has a crazy wheel 5. Particular notice will be taken of the wheel mountings. The mounting for the wheels 4 is comprised of independent hangers 6, which latter are pivoted at $a$ to the members 7, rigid with the frame 1. A reach bar 8 is pivotally connected to the said members 6, carrying the wheels 4 and at its approximate middle is embraced by a guide 9, opposing which are stop collars 10, situated for adjustment on the said reach bar 8. Obviously, the wheels 4 move in unison, by reason of the positive action obtained through the medium of the said reach bar 8.

The wheel 5 situated between and in front of the wheels 4 is capable of independent movement to conform to any peculiar movement of the apparatus and has a mounting 11, which is rigidly mounted upon a shaft 12, which latter is rotatably connected to the frame 1 by bearings 13.

An arm 14, held by the bracket or brace 11, provides a suitable hanger to complete the mounting for the wheel 5. This wheel rests upon the ground and follows the movement of the apparatus, and when the apparatus is lifted to withdraw the earth engaging elements from the ground, rotation of shaft 12 in the manner to be hereinafter explained will rock the brace 11 on the wheel 5 and thus raise the frame.

Disposed longitudinally and arranged for rotary movement in the frame 1 is a shaft 15, wherein is made a series of apertures to receive the shanks 16 of a series of spirally arranged hoes 17, as shown in Figures 2 and 4 especially. It will be noted in Figure 4 that one end of the shank 16 is substantially tapered and has a nut 18 threaded thereon. This arrangement makes for a more rigid connection between the hoe shank and its mounting, the rotary shaft 15.

Referring now particularly to the mounting or rather the means by which the apparatus is suspended from the tractor 3, it is pointed out in Figures 1 and 2 that a bracket 19 is connected to the rear axle of the tractor 3 and to which is rigidly connected a bent bar 20, the opposite end thereof being joined to a solid and immovable part of the tractor 3. Connected also to the bracket 19 is a straight bar 21, which latter enters a tubular member 22, disposed in oblique relationship relative to the frame 1 of the apparatus and is mounted within a sleeve 23, rigid with the frame 1, as shown in Figure 2 and extending through this sleeve where a ring 24 is connected to the protruding and reduced end of the said tubular member 22.

To the ring 24 is connected a link 25, to which in turn is connected a spring 26. A similar link 27 joins the opposite end of the spring to a ring 28, integral with a collar 29 embracing the upper end of the straight rod 21, which latter enters the tubular member 22.

Contained within the tubular member 22 is a spring 30, it being pointed out that the rod 21 passes through the spring 30 and has a nut 31 on its opposite end while a collar 32 maintains stationary position of the spring at the open end of the tubular member 22. Thus it may be seen that the springs 26 and 30 are equalized to maintain operative position of the apparatus but should the latter collide with any resisting obstacles, displacement will occur, which will be assumed by the springs 26 and 30 and prevent fracture of any of the elements of the combination.

It will be seen presently that other connections between the apparatus and the tractor 3 likewise provide for flexibility of the apparatus relative to the tractor. In this connection, a brace rod 33 is joined to the rear axle of the tractor, continues downward and is connected to the outer end of a rod 34, as shown in Figure 2, which latter is capable of flexibility, by reason of the loop 35 therein.

The clevis 36 has its ends pivotally joined to the frame 1 by means of the bearings 37, and, as apparent in Figure 3, the clevis is provided with a projection through which the end of said rod 34 is passed and over which the looped end of brace rod 33 is placed and held thereupon by a nut, as shown. Thus, while the clevis 36 remains in perpendicular position, the frame may be moved up and down on the pivots afforded by the bearings 37. In being so moved, however, rotative movement is required at the point where the rod 34 is connected to the clevis 36. Therefore, a sleeve 38 is provided in which the rod 34 is inserted and permits the frame 1 to be elevated without torsional strain on the said rod 34. Also connected to the sleeve 38 at $b$ is a spring 39, previously referred to, which cooperates with the looped rod 34 in maintaining a proper operative position of the apparatus.

Concerning the power transmitting assemblage, power is primarily obtained from the conventional power take-off shaft 40 of the tractor 3, upon which is situated a beveled gear 41, cooperating with which is a similar gear 42, contained within a housing 43. The gear 42 is situated upon a shaft 44 which extends downward within the housing 45 and has a similar beveled gear 46 mounted thereon and engages another beveled gear 47, mounted on the universal shaft 48. A friction clutch 49 is arranged on the shaft 48 for connecting and disconnecting the same with the shaft 50, which latter has universal connection with the rotary hoe carrying shaft 15, extending longitudinally through the frame 1. It is apparent therefore that rotation imparted to the main drive shaft 40 will in turn rotate shaft 44 and, through the medium of gears 46 and 47, shaft 48 is rotated which latter transmits rotary motion to shaft 50, which in turn causes the hoe carrying shaft 15 to rotate, rendering operative the spirally disposed hoes 17. The raising and lowering device referred to in the foregoing is partially shown in detail in Figure 5 and consists of a shaft 51 having a wheel 52 mounted thereon, adjacent the tractor steering wheel, in order that it will be accessible to the operator. A bracket 53 holds the shaft 51 rigid with the side of the tractor 3. The lower end of the shaft 51 enters a substantially circular housing 54 and about which is provided a packing nut 55, engaging suitable packing 56 at the point in the said housing 54 where the shaft 51 enters the same. A worm 57 is mounted upon the extreme lower end of the said shaft 51 and is enmeshed by a worm gear 58, rotatably mounted in the center of the housing 54 and carries an arm 59.

Rotary movement imparted to the shaft 51 will obviously swing the outer end of the arm 59 in a circular manner as indicated by the dotted position thereof in Figure 5, by reason of the enmeshed relationship of the worm 57 and gear 58. The arm 59 referred to in the foregoing is connected to a rod 60, as shown more clearly in Figure 2 and which rod engages a crank arm 61, connected to or a part of the shaft 12, situated in parallel relationship with the frame 1, as previously mentioned.

It will be noted, especially in Figure 1 that the exhaust pipe 62 enters the hood 63 surmounting the frame 1. In so discharging the exhaust gases, the operator of the apparatus is relieved of any ill effects resulting therefrom. The arrangement provides a further advantage in that the dust created under the hood 64 by the rapid rotary movement of the hoes 17 is blown out at the end of the apparatus opposite the end adjacent the tractor 3, further relieving the operator of the annoying fog or dust.

In operation, the tractor 3 is driven between rows of trees, as in an orchard the hood 63 passing underneath the usually low hanging boughs and limbs and foliage of the trees, the bumper or curved end 2 coming in close relationship with the trees. The transmission drive shaft 40 rotates shaft 44 through the gear arrangement 41 and 42 and the shaft 44 imparts rotation to shaft 48 through the gear arrangement 46 and 47, thereby rotating shaft 50, imparting rotary motion to the hoe carrying element through shaft 50. The hoes 17 are situated in such close relationship as to cover all the soil over which the apparatus is passed, thus the soil is very thoroughly pulverized and all weeds and other foreign growth is eliminated.

Frequently, the operator moves the apparatus too close to the trees and the bumper 2 collides therewith. In this event, springs 26 and 30 have an equalizing effect to return the frame into normal operative position, aided by the yieldability of the rod 34. When so displaced, it is necessary that the several elements of the suspending means be likewise displaced, therefore the rod 21 is slidably received in the tubular housing 22 for the spring 30. Anticipating such displacement of the apparatus relative to the tractor 3, universal joints are provided in the shafts 48 and 50, which transmit rotary motion to the hoe carrying shaft 15.

It has been previously mentioned that the plow is capable of lateral displacement to yield to obstructions but it has also been found to be very effective in terracing or in eliminating foreign vegetable growth or embankments and the like, it being obvious that the tractor may be driven on level ground, while the frame or plow proper may operate at an incline on the embankment.

The invention is not limited solely to the purposes therefor hereinbefore set forth as it is obvious that its application will be fully as effective in conditioning the soil for planting and for the cultivation of vegetation and it will be understood that certain changes and modifications may be resorted to from time to time as may be regarded practicable without departing from the spirit and intent of the invention as set forth in the following claims therefor.

I claim:

1. An agricultural implement arranged for detachable securement to a draft implement whereby the same will extend outwardly therefrom and at right angles thereto and having rotary earth engaging elements in equi-distantly spaced relationship and means to allow said implement to yield to the impact of a colliding obstacle.

2. An agricultural implement arranged for securement to one side of a tractor including a frame and a rotary shaft having flexible connection with the power take-off drive of said tractor, a series of spaced, soil engaging elements carried by said rotary shaft, a hood surmounting said soil engaging elements and means connecting said frame to said tractor to allow for yielding movement thereof and to return said frame to normally operative position when displaced.

3. A plow for orchards and the like including a frame flexibly connected to and extending outwardly from a tractor having a rotary hoe carrying element flexibly connected to the power take-off drive of said tractor, the said flexible connection to said tractor including a series of yielding elements of normally equalized tension, cooperating to maintain operative position of said frame and to allow for displacement of said frame when colliding with an obstacle in its path.

4. An agricultural implement arranged for detachable securement to a draft implement including a shaft extending at right angles to said draft implement and having a non-rigid connection to the said implement, a series of spaced, spirally arranged hoes, carried by such shaft, a frame, means connecting said frame to said implement at a point spaced from the connecting point of said shaft and capable of yieldability, ground engaging means for supporting said frame and means carried by said frame for concealing said hoe carrying shaft.

5. An agricultural implement arranged for detachable securement to one side of a tractor including a frame and a rotary shaft having a flexible connection with the power take-off of said tractor, a series of spaced, spirally arranged hoes carried by said rotary shaft, a hood surmounting said spirally arranged hoes, means connecting said frame to said tractor to allow for yielding movement thereof and means for axially rocking said frame to elevate said hoe carrying shaft.

In testimony whereof I affix my signature.

JOHN S. GOODMAN.